United States Patent [19]
Belart et al.

[11] Patent Number: 4,741,161
[45] Date of Patent: May 3, 1988

[54] BRAKING PRESSURE GENERATOR FOR A HYDRAULIC BRAKE SYSTEM FOR AUTOMOTIVE VEHICLES

[75] Inventors: Juan Belart, Moerfelden-Walldorf, Spain; Wolfram Seibert, Pfungstadt; Norbert Ocvirk, Offenbach, both of Fed. Rep. of Germany

[73] Assignee: Alfred Teves GmbH, Frankfurt am Main, Fed. Rep. of Germany

[21] Appl. No.: 938,865

[22] Filed: Dec. 8, 1986

[30] Foreign Application Priority Data

Dec. 9, 1985 [DE] Fed. Rep. of Germany ....... 3543479

[51] Int. Cl.⁴ ............................................. B60T 13/00
[52] U.S. Cl. ................................. 60/547.1; 60/576; 60/577; 60/589
[58] Field of Search ............. 60/547.1, 577, 578, 60/589, 548, 576

[56] References Cited

U.S. PATENT DOCUMENTS

| | | | |
|---|---|---|---|
| 2,544,042 | 3/1951 | Pontius et al. | |
| 4,191,020 | 3/1980 | Krohn | 60/577 |
| 4,244,185 | 1/1981 | Belart | 60/577 |
| 4,341,076 | 7/1982 | Steffes | 60/581 |
| 4,621,498 | 11/1986 | Schaefer | 60/578 |
| 4,642,990 | 2/1987 | Mizusana | 60/578 |
| 4,649,707 | 3/1987 | Belart | 60/589 |
| 4,662,688 | 5/1987 | Reinartz | 60/577 |

FOREIGN PATENT DOCUMENTS

| | | |
|---|---|---|
| 2360133 | 6/1974 | Fed. Rep. of Germany. |
| 3215266 | 11/1982 | Fed. Rep. of Germany. |
| 2103464 | 4/1972 | France. |
| 2314381 | 1/1977 | France. |
| 2091363 | 7/1982 | United Kingdom. |

Primary Examiner—Abraham Hershkovitz
Attorney, Agent, or Firm—James B. Raden; Robert P. Seitter

[57] ABSTRACT

A braking pressure generator with a master brake cylinder (2) and a hydraulic brake power booster (1) connected upstream thereof and comprising a piston (16) of larger effective surface which latter is incorporated axially movably within limits in a bore (15) in a stepped piston (10) of smaller effective surface extending through the booster chamber (8). The piston (16) serves to actuate a master cylinder piston (31). During an actuating action the two pistons (10, 16) are maintained in their position moved apart from one another even in the event of pressure drop in the booster chamber or in excess of the point of maximum boosting. This is accomplished in that both pistons (10, 16) enclose a pressure chamber (23) which is connectible to the booster chamber (8) through a valve passage (19) closable by the actuating element (6) of the brake power booster (1) as well as through a non-return valve (25) in parallel relationship thereto.

5 Claims, 1 Drawing Sheet

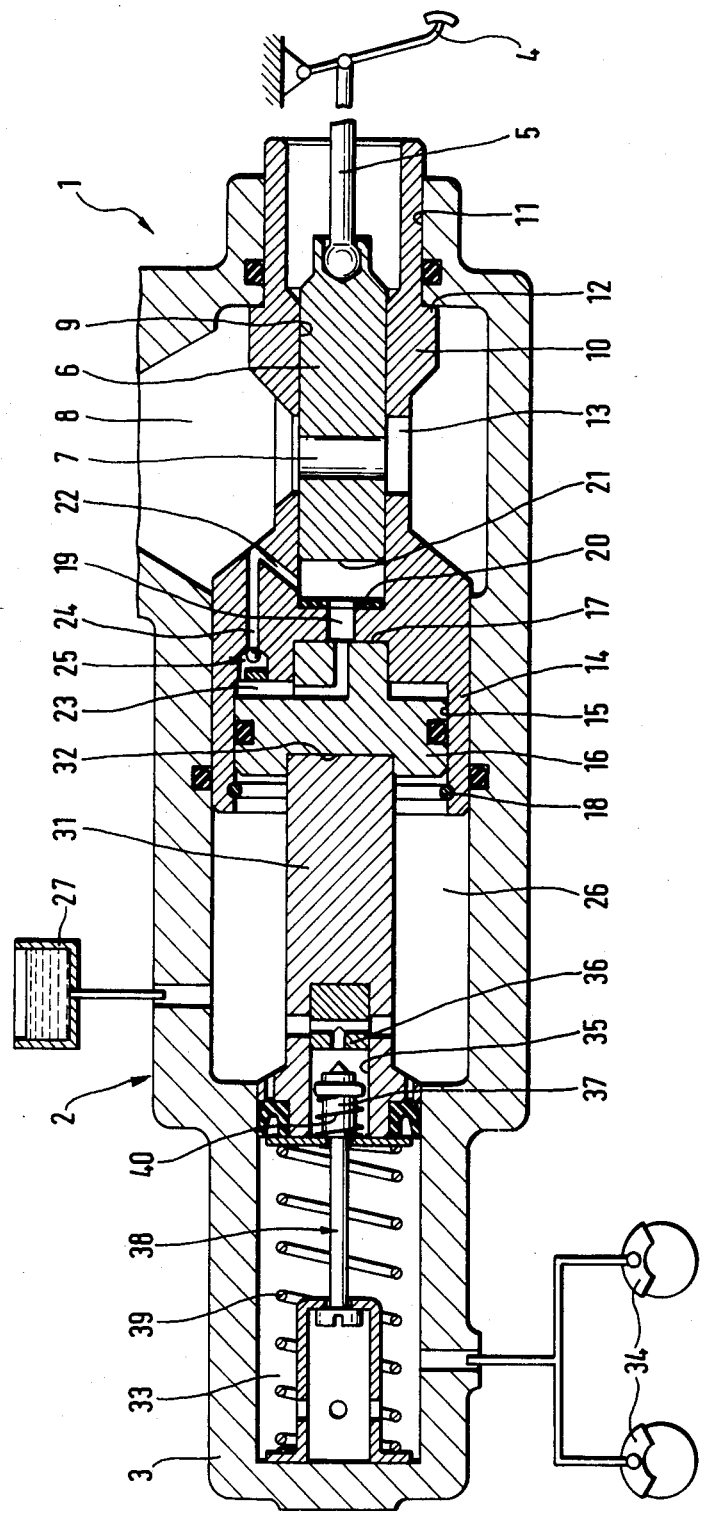

BRAKING PRESSURE GENERATOR FOR A HYDRAULIC BRAKE SYSTEM FOR AUTOMOTIVE VEHICLES

BACKGROUND OF THE INVENTION

The invention pertains to a braking pressure generator for a hydraulic brake system for automotive vehicles, with a master brake cylinder whose working chamber is in communication with an unpressurized compensating reservoir in the brake release position by way of a valve closable by the actuating stroke of the master cylinder piston. A hydraulic brake power booster is connected upstream of the master brake cylinder and comprises a booster piston designed as a stepped piston which latter penetrates the booster chamber and is composed of two pistons of differing effective surfaces movable in relation to one another. The pistons are applicable in opposed directions by the pressure in the booster chamber and stops limit their relative movement to an amount which at least corresponds approximately to the closure travel of the valve in the master brake cylinder. Both pistons are movable by resilient means to abut on one another in the direction of brake release, and the piston of smaller effective surface is movable to abut on a housing stop, as illustrated in patent application No. P 35 23 372.9.

In such braking pressure generators only little actuating force and low pressure in the booster chamber are required to initiate a braking action. This is accomplished in that, in the initial phase of braking, first the piston with the larger hydraulic effective surface is effective alone for the purpose of actuating the master brake cylinder so that the entire larger effective surface is available in order to generate the displacement force required to overcome the friction caused by the seals and the resetting springs. The piston of smaller effective surface remains in abutment on the housing stop in this initial phase of braking and thus contributes also to reducing the initial resistance to displacement. Furthermore, the moving apart of the two pistons in the initial phase of braking reduces the actuating travel at the control member of the braking pressure generator, and desired actuating characteristics are thereby achieved.

In the braking pressure generator according to the noted patent application, the two pistons of the booster piston will be kept apart exclusively by the pressure in the booster chamber. If the pressure in the booster chamber drops or if the braking pressure generator is actuated beyond its maximum boosting effect, the pistons will move towards one another again and thus bring about increase of the actuating travel at the control member of the braking pressure generator.

It is the object of the present invention to provide a braking pressure generator of the type referred to wherein the pistons of the booster piston are maintained in their position moved apart from one another during an actuating action even in the event of pressure drop in the booster chamber or in excess of the maximum boosting effect.

SUMMARY OF THE INVENTION

This object is achieved by the present invention in that the two pistons enclose a pressure chamber which is enlargeable by their moving apart and which is connected to the booster chamber through a valve passage, and in that the valve passage is closable at least in the event of the brake power booster being at its maximum output. This allows hydraulic locking of the two pistons in relation to one another when the brake power booster is at its maximum output, so that the actuating travel which is gained at the beginning of an actuating action by the moving apart of the pistons will be preserved also in the point of maximum boosting. In the event of decline of the pressure in the booster chamber, the maximum boosting effect will be attained with correspondingly less actuating force. Therefore, the locking of the two pistons in accordance with the present invention will then become effective at a lower actuating pressure already. Closing of the valve passage in the braking pressure generator is preferably performed by means of the control member of the brake power booster. This ensures a simple design of the braking pressure generator.

In order to prevent that on quick actuation of the braking pressure generator the valve passage will be closed before the two pistons have moved apart from one another, according to another feature of the present invention, the pressure chamber can be connected, with the booster chamber, in parallel to the valve passage, by means of a channel containing a non-return valve opening towards the pressure chamber. If the valve passage is closed prematurely, pressure fluid out of the booster chamber will be introduced by way of the non-return valve for as long as until the two pistons have adopted their moved-apart position.

According to a preferred embodiment of the present invention, a simple design of the brake power booster can be attained in that the piston of smaller effective surface penetrates the booster chamber and accommodates a longitudinal bore which is closed by the piston of larger effective surface towards the master brake cylinder. In a further improvement, the longitudinal bore may penetrate the piston of smaller effective surface and, on its end remote from the master brake cylinder, may comprise a piston-type actuating element which forms a closure element for the valve passage designed inside the longitudinal bore.

BRIEF DESCRIPTION OF THE DRAWING

The present invention will be described in more detail hereinbelow by way of an embodiment with reference to the accompanying drawing wherein the single FIGURE displays a longitudinal cross-section through the master brake cylinder and the booster chamber of the braking pressure generator in accordance with the present invention which is provided for the actuation of a brake system for automotive vehicles.

DETAILED DESCRIPTION

The braking pressure generator illustrated in the drawing is composed of a brake power booster 1 and a master brake cylinder 2 which are accommodated in one joint housing 3. For the actuation of the brake power booster 1, there is provision of a brake pedal 4 which, by way of a push rod 5, acts upon a piston-type control rod 6 having a cross bore 7. Control rod 6 projects into a booster chamber 8 and is guided and sealed in a longitudinal bore 9 of a stepped piston 10. With its end close to the brake pedal 4, the stepped piston 10 is sealed and guided in a bore 11 in the wall of the housing 3 and bears with a butt collar 12 against the inner wall of the housing 3. In the area of the cross bore 7, the stepped piston 10 has a longitudinal slot 13, into which a non-illustrated scissors-type lever can be radially inserted which engages with one lever arm into the longitudinal slot 13, while it engages with a second lever arm into the cross bore 7. By means of the scissors-type lever, a relative movement between the control rod 6 and the stepped piston 10 can be transmitted onto a control valve (not shown) which causes control of the booster pressure in the booster chamber 8.

On the side remote from the brake pedal 4, the stepped piston 10 is furnished with a piston head 14 which incorporates in a stepped bore 15 a piston 16 whose axial movability is confined by a stop surface 17 and a circlip 18. The stepped bore 15 is in communication with the longitudinal bore 9 through a valve passage 19 which is closable by the control rod 6. To this end, there is provision of a sealing element 20 on the side of the valve passage 19 close to the control rod 6, on which sealing element the end surface 21 of control rod 6 can abut. Terminating into the longitudinal bore 9 directly adjacent to the sealing element 20 is a connecting bore 22 which provides communication between the longitudinal bore 9 and the booster chamber 8.

The stepped bore and the piston 16 enclose a pressure chamber 23 which, in parallel to the valve passage 19, is in communication with the booster chamber 8 by way of a connecting bore 24 and a non-return valve 25 opening towards the pressure chamber 23. Therefore, the pressure fluid in the booster chamber may propagate into the pressure chamber 23 through the connecting bore 22, the longitudinal bore 9 and the valve passage 19 as well as through the connecting bore 24 and the non-return valve 25. Return flow of the pressure fluid out of the pressure chamber 23 into the booster chamber 8 is only possible by way of the open valve passage 19.

The hydraulic effective surfaces of the stepped piston 10 extending through the booster chamber 8 are dimensioned such that a pressure in the booster chamber 8 will cause a low resultant force at the stepped piston 10 which force acts in the direction of brake release and by virtue of which the stepped piston 10 is urged with its butt collar 12 against the housing 3. Hence it follows that the actuating force required for the actuation of the master brake cylinder 2 is generated exclusively by the hydraulic effective surface of the piston 16.

The master brake cylinder 2 contains a master cylinder piston 31 which, with its one end, is placed and supported in an indentation 32 in the piston 16 and, with its other end, confines a working chamber 33 of the master brake cylinder 2. Wheel brakes 34 are connected to the working chamber 33. The master cylinder piston 31 contains a central bore 35 wherein a valve seat 36 is incorporated which, in conjunction with a closure element 37 axially slidably guided in the central bore 35, forms a central valve through which the working chamber 33 is in communication with a compsensating chamber 26 in the opened position illustrated in the drawing, the compensating chamber being in communication with a supply reservoir 27. Compensating chamber 26 is disposed between the booster chamber 8 and the working chamber 33 and forms a chamber into which the piston head 14 is allowed to plunge during an actuating action. The closure element 37 of the central valve is kept in its opened position by means of a telescopic rod assembly 38, a master-cylinder resetting spring 39 and a valve spring 40.

The mode of operation of the braking pressure generator will be described in more detail starting from the condition of brake release in which its movable parts adopt their position illustrated in the drawing. The working chamber 33 of the master brake cylinder 2 and the booster chamber 8 of the brake power booster 1 are unpressurized in this position. The central valve 36, 37 is open and the master-cylinder resetting spring 39 urges the stepped piston 10 with its butt collar 12 against the housing 3 by way of the master-cylinder piston 31 and the piston 16.

On depression of the brake pedal 4, first the control rod 6 is displaced to the left, when viewing in the drawing, and by way of the scissors-type lever (not shown), the control valve of the brake power booster 1 will be opened, the pressure in the booster chamber 8 beginning to rise as a result thereof. This pressure simultaneously propagates through the open valve passage 19 and in parallel thereto through the non-return valve 25 into the pressure chamber 23 and thus acts upon the entire cross-sectional surface of the piston 16, thereby causing the piston to displace to the left in the acutating direction, while the stepped piston 10 is kept in abutment on the housing 3 by the resultant force effective in opposite direction. The effective surface of the piston 16 is dimensioned such that a comparatively low pressure of 3 bar will suffice to overcome the friction caused by the seals and the spring forces and to actuate the master cylinder piston 31.

Corresponding to the further rise of the pressure in the booster chamber 8, the piston 16 and the master cylinder piston 31 continue to displace in the actuating direction, until the valve seat 36 is abutting on the closure element 37 and the central valve is closed thereby. Approximately simultaneously, the piston 16 comes into engagement with the circlip 18 in the piston head 14 and thereby is coupled to the stepped piston 10 in the actuating direction. As a result, the stepped piston 10 and the piston 16 will form a unity of motion as the actuation continues, the resultant pressure force acting upon the stepped piston 10 in the direction of brake release being overcome by the actuating force of the piston 16. The hydraulic effective surface in the booster chamber 8 which is decisive for the generation of the actuating force acting upon the master cylinder piston 31 will result from the difference of the effective cross-sectional surfaces of the stepped piston 10 and the piston 16. The actuating force at the brake pedal corresponds in each case to the force which is generated by the application of booster pressure on the control rod 6.

Due to the piston 16 advancing alone in the initial phase of the actuation, upon the introduction of a braking action, the lost travel of the brake pedal 4 will first be limited to that travel which is needed to open the control valve of the brake power booster 1. In connection with the low actuating pressure which is required for displacement of the piston 16, characteristics of actuation will be achieved which are particularly favorable for vehicular brake systems.

Since, on rapid and intense actuation of the control rod 6, the valve passage 19 can be closed before the piston 16 has reached the circlip 18, it is possible to fill the pressure chamber 23 in parallel to the valve passage 19 by way of the connecting bore 24 and the non-return valve 25. It is thus ensured that the piston 16 will reach the circlip 18 even in the event of a quick actuation of the control rod 6 and will contribute to a corresponding reduction of the actuating travel at the brake pedal 4.

When, on brake application, the maximum boosting effect of the brake power booster is attained by further increasing the actuating force on the brake pedal 4, while the pressure introduced into the booster chamber 8 has reached its maximum value, the end surface 21 of the control rod 6 will abut on the sealing element 20 and thereby close the valve passage 19. This way, the actuating force introduced by way of the control rod 6 can be transmitted onto the piston 16 and the master cylinder piston 31 by way of the pressure fluid enclosed in the pressure chamber 23. The increase of the actuating force beyond the maximum output of the brake power booster is therefore possible without any loss in travel. The same mode of effect will result, if the pressure in the booster chamber drops partially or completely during an actuating action. Also, in this event, the end surface 21 of the control rod 6 will move into abutment on the sealing element 20 and thereby enable a force transmission by way of the pressure fluid enclosed in the pressure chamber 23 until the actuating action is terminated. Because of this, the driver will not be taken by surprise by a sudden depression of the brake pedal 4 during a braking operation.

What is claimed is:

1. A braking pressure generator for a hydraulic brake system for automotive vehicles, with a master brake cylinder whose working chamber is in communication with an unpressurized compensating reservoir in the brake release position via a valve closable by the actuating stroke of the master cylinder piston, and with a hycraulic brake power booster connected upstream of the master brake cylinder and comprising a booster piston designed as a stepped piston, which latter penetrates the booster chamber and is composed of two pistons of differing effective surfaces movable in relation to one another and being applicable in opposed directions by the pressure in the booster chamber and comprising stops which limit their relative movement to an amount which at least corresponds approximately to the closure travel of the valve in the master brake cylinder, both pistons being movable by resilient means to abut on one another in the direction of brake release, and the piston of smaller effective surface being movable to abut on a housing stop, wherein the two pistons (10, 16) enclose a pressure chamber (23) which is enlargeable by their moving apart and which is connected to the booster chamber (8) through a valve passage (19), and in that the valve passage (19) is closable at least in the event of the brake power booster (1) being at its maximum output.

2. A braking pressure generator as claimed in claim 1, wherein, the closing of the valve passage (19) is performed by means of the control member (6) of the brake power booster (1).

3. A braking pressure generator as claimed in claim 2, wherein, the pressure chamber (23) is connected, in parallel to the valve passage (19), with the booster chamber (8) by a channel (24) containing a non-return value (25) opening towards the pressure chamber (23).

4. A braking pressure generator as claimed in claim 3, the piston (10) of smaller effective surface penetrates the booster chamber (8) and accommodates a longitudinal bore (15) which is closed towards the master brake cylinder (2) by the piston (16) of larger effective surface.

5. A braking pressure generator as claimed in claim 4, wherein the longitudinal bore (15, 9) penetrates the piston (10) of smaller effective surface and, in its end remote from the master brake cylinder (2), comprises a piston-type actuating element (6) which forms a closure element for the valve passage (19, 20) designed in the longitudinal bore (15, 9).

* * * * *